(12) United States Patent
Kim et al.

(10) Patent No.: US 10,778,467 B2
(45) Date of Patent: Sep. 15, 2020

(54) METHOD FOR PROVIDING VIRTUAL CPE SERVICE BY USING SINGLE INTERNET LINE AND NETWORK FUNCTION VIRTUALIZATION CLOUD

(71) Applicant: KT Corporation, Seongnam-si (KR)

(72) Inventors: Nam Gon Kim, Daejeon (KR); Je Chan Han, Daejeon (KR); Ki Sang Ok, Daejeon (KR); Hyun Ho Jeong, Daejeon (KR)

(73) Assignee: KT Corporation, Seongnam-si (KR)

( * ) Notice: Subject to any disclaimer, the term of this patent is extended or adjusted under 35 U.S.C. 154(b) by 0 days.

(21) Appl. No.: 16/315,048

(22) PCT Filed: Jul. 4, 2017

(86) PCT No.: PCT/KR2017/007065
§ 371 (c)(1),
(2) Date: Apr. 12, 2019

(87) PCT Pub. No.: WO2018/008933
PCT Pub. Date: Jan. 11, 2018

(65) Prior Publication Data
US 2019/0245717 A1    Aug. 8, 2019

(30) Foreign Application Priority Data

Jul. 4, 2016    (KR) .................. 10-2016-0084412

(51) Int. Cl.
*H04L 12/46*    (2006.01)
*H04L 29/10*    (2006.01)
(Continued)

(52) U.S. Cl.
CPC ...... *H04L 12/4654* (2013.01); *H04L 12/2834* (2013.01); *H04L 12/2869* (2013.01);
(Continued)

(58) Field of Classification Search
CPC combination set(s) only.
See application file for complete search history.

(56) References Cited

U.S. PATENT DOCUMENTS

2015/0201228 A1    7/2015    Hasek
2015/0372973 A1*  12/2015    Lopez Da Silva ..........
H04L 12/2856
370/254

(Continued)

FOREIGN PATENT DOCUMENTS

JP    2016-57672 A    4/2016

OTHER PUBLICATIONS

International Search Report for PCT/KR2017/007065 dated Nov. 6, 2017 [PCT/ISA/210].

*Primary Examiner* — Vinncelas Louis
(74) *Attorney, Agent, or Firm* — Sughrue Mion, PLLC

(57) ABSTRACT

An NFV cloud for providing a vCPE service by using a single Internet line may comprise: a vCPE service having a virtual LAN interface, a virtual WAN interface, and a virtual management interface; a virtual LAN network, a virtual WAN network, and a virtual management network connected to the virtual LAN interface, the virtual WAN interface, and the virtual management interface, respectively; a physical LAN interface for providing customer traffic to the virtual LAN network; a physical WAN interface for connecting the virtual management network to the outside in order to output, to the outside, traffic which has been output from the virtual WAN network and passed through the vCPE service, or to provide a management function for the vCPE service or the NFV cloud; and an interface agent for controlling a connection between the physical WAN interface and the virtual WAN network or the virtual management network.

18 Claims, 8 Drawing Sheets

(51) Int. Cl.
*H04L 12/24* (2006.01)
*H04L 12/28* (2006.01)
*H04L 12/66* (2006.01)

(52) U.S. Cl.
CPC .......... *H04L 12/2898* (2013.01); *H04L 29/10* (2013.01); *H04L 41/08* (2013.01); *H04L 12/2856* (2013.01); *H04L 12/66* (2013.01); *H04L 41/5054* (2013.01)

(56) References Cited

U.S. PATENT DOCUMENTS

| | | | |
|---|---|---|---|
| 2016/0020962 A1* | 1/2016 | Carey | H04L 41/5054 709/223 |
| 2016/0127226 A1 | 5/2016 | Bays | |
| 2017/0192806 A1* | 7/2017 | Koat | H04L 12/66 |

* cited by examiner

【FIG. 1】
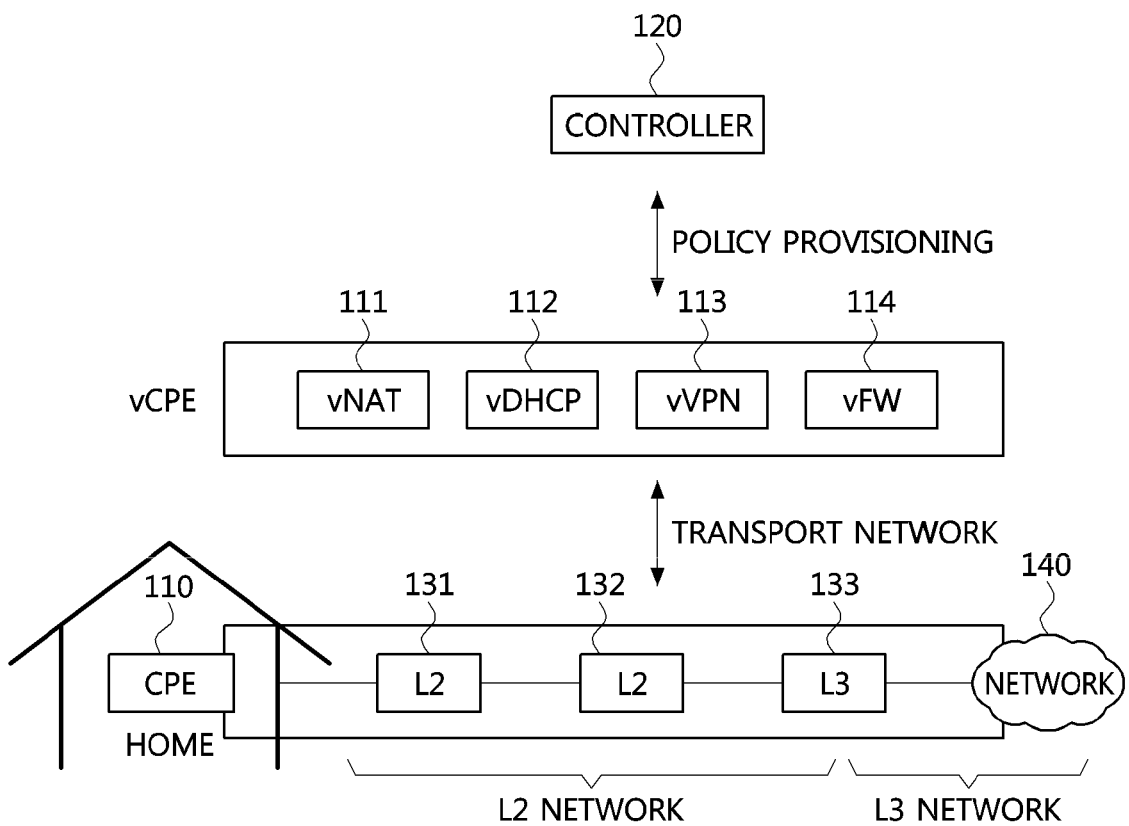

[FIG. 2]
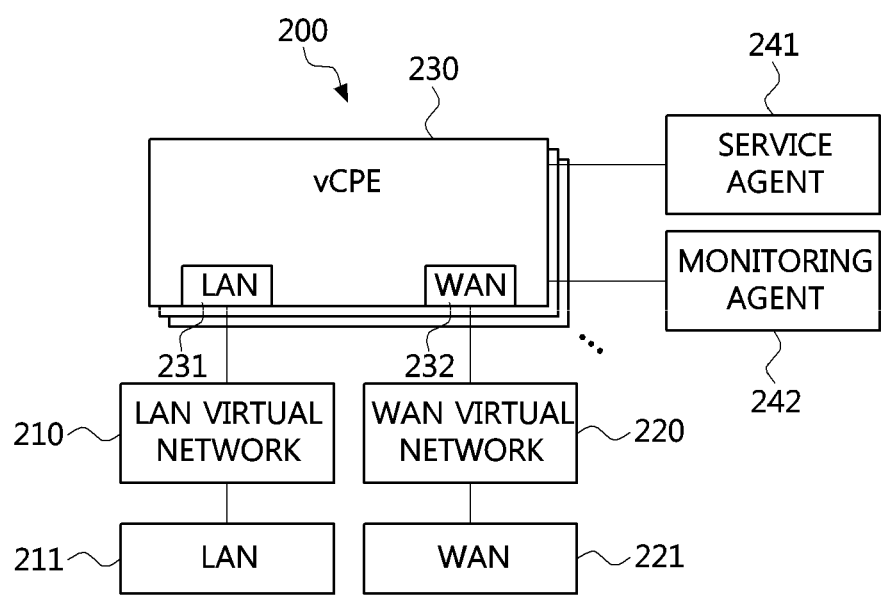

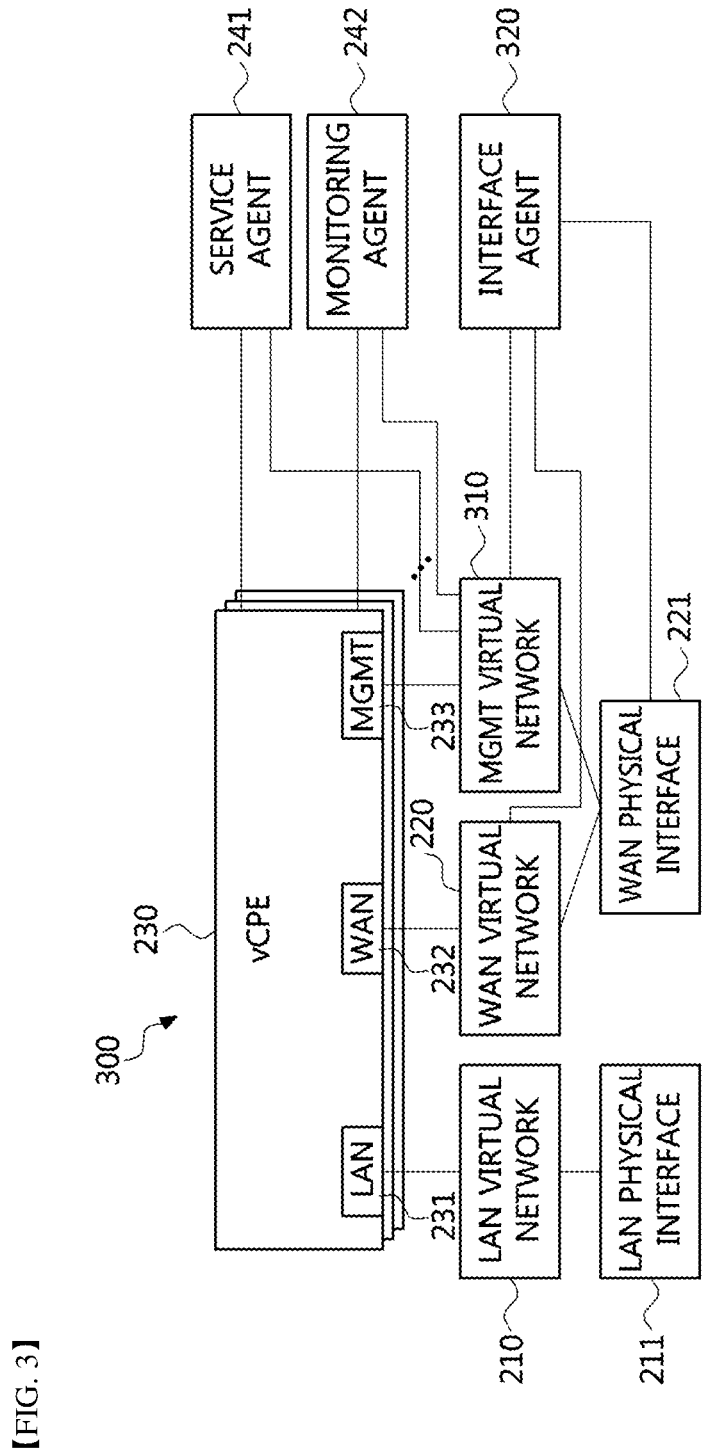
[FIG. 3]

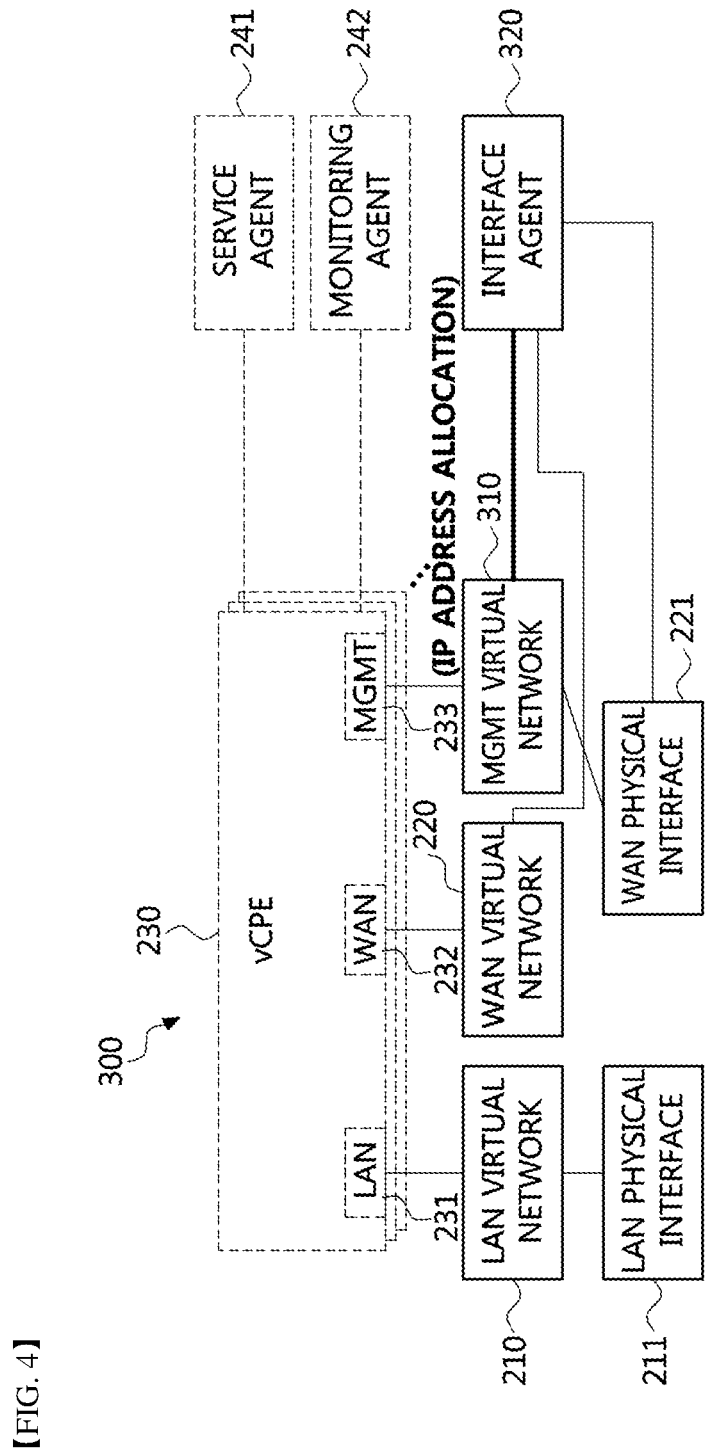
[FIG. 4]

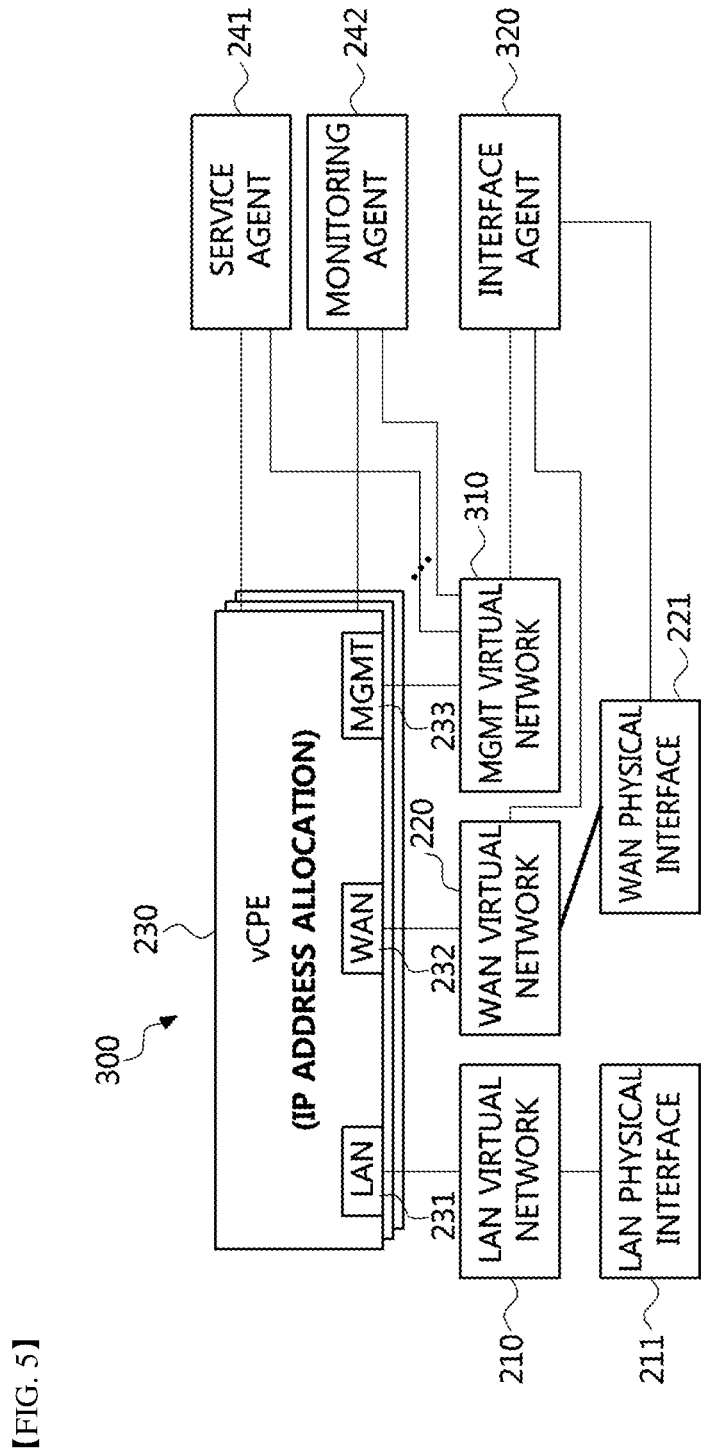
[FIG. 5]

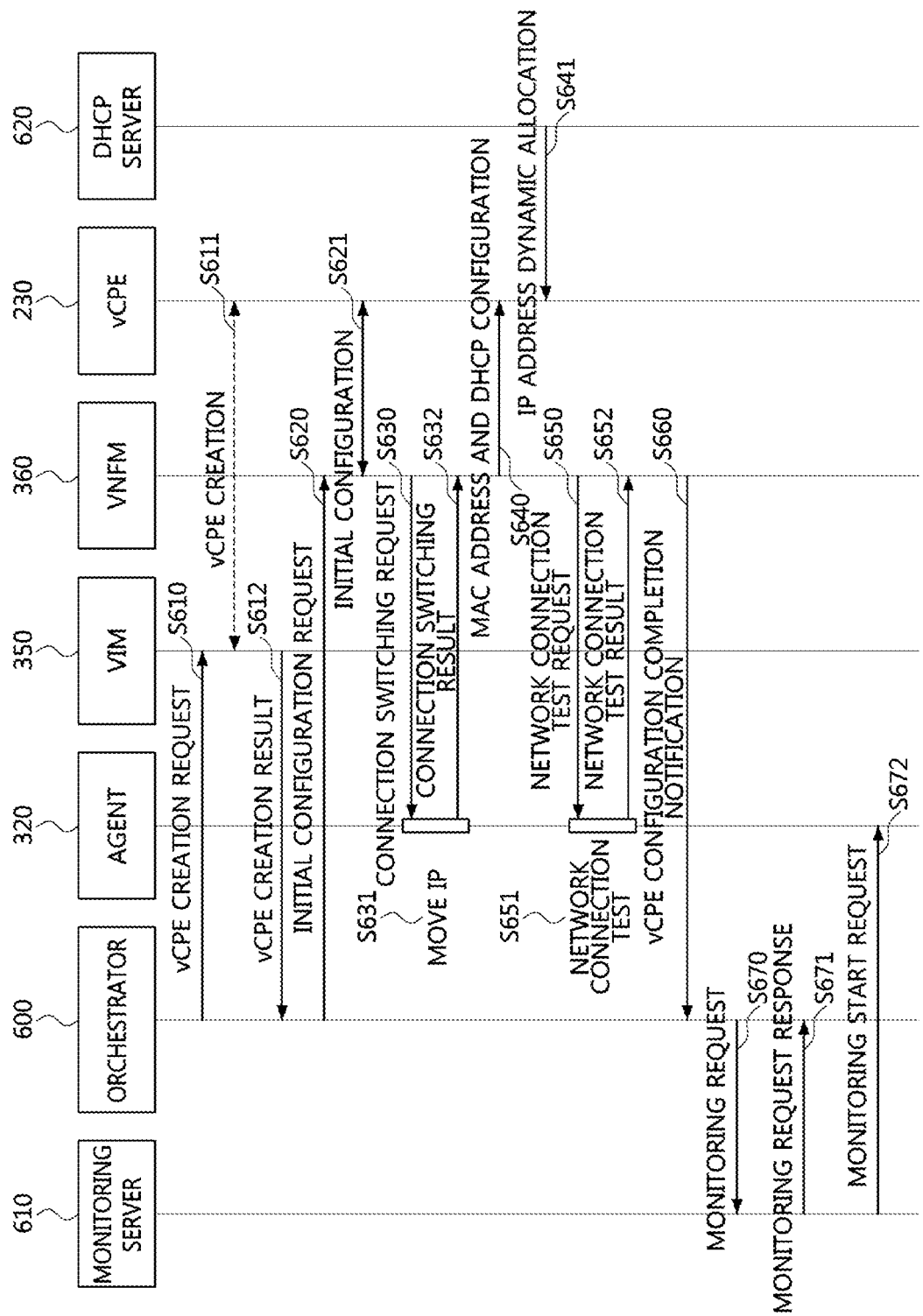
[FIG. 6]

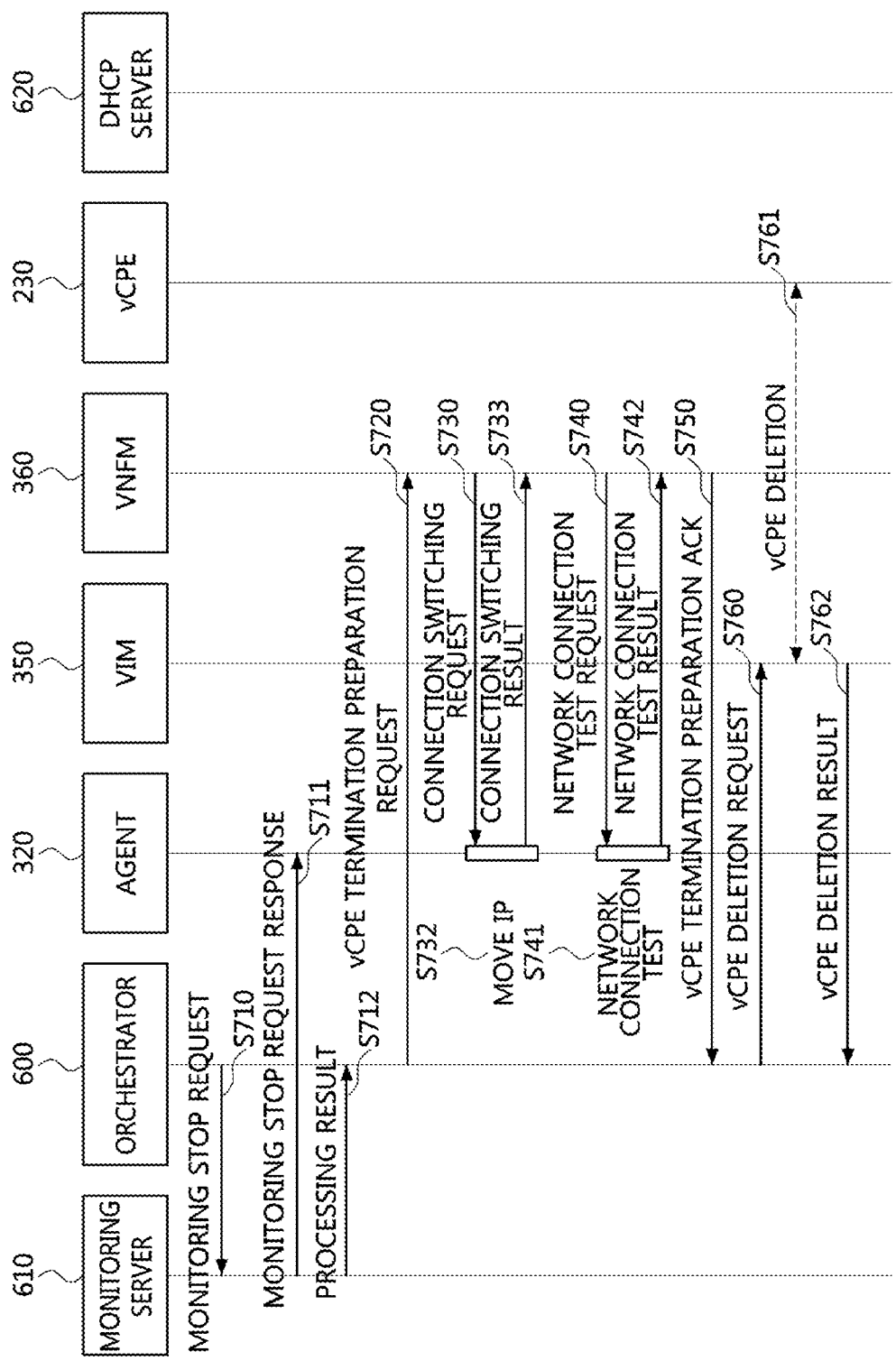
[FIG. 7]

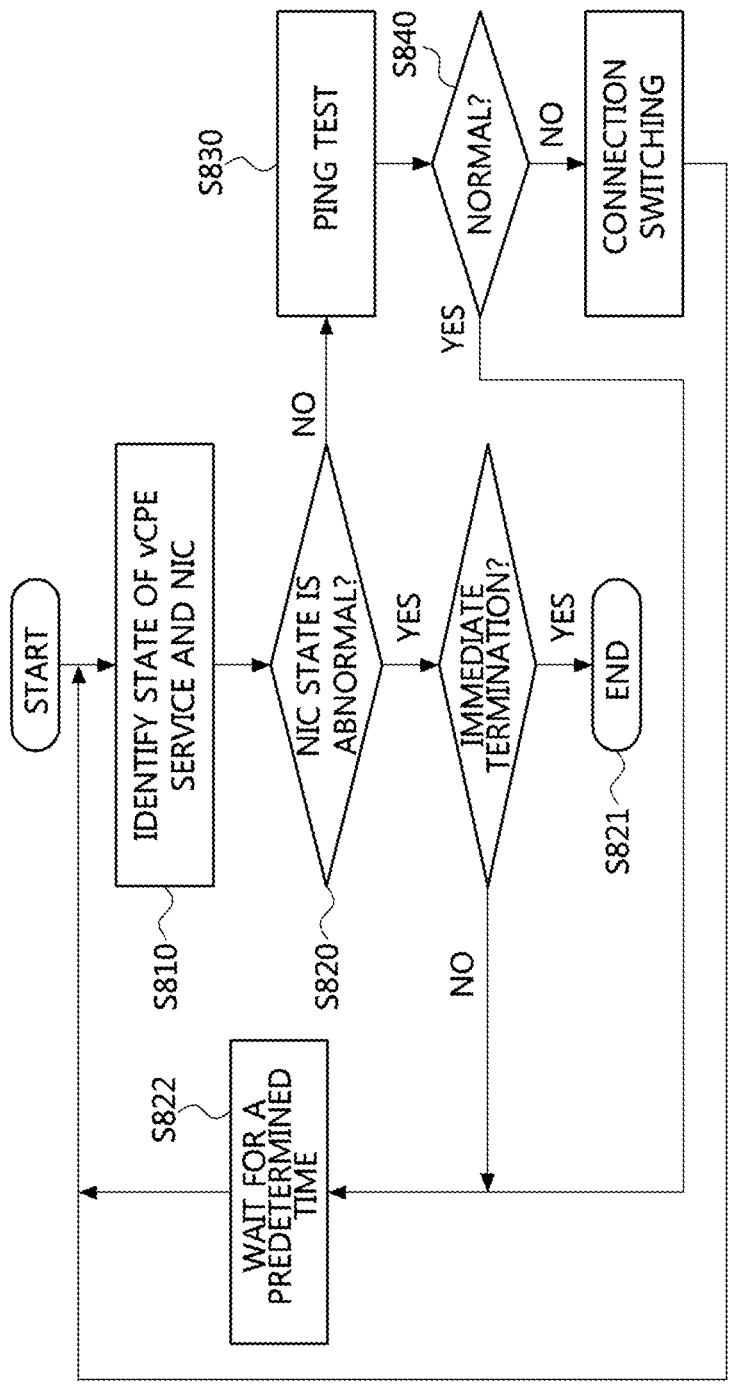
[FIG. 8]

METHOD FOR PROVIDING VIRTUAL CPE SERVICE BY USING SINGLE INTERNET LINE AND NETWORK FUNCTION VIRTUALIZATION CLOUD

TECHNICAL FIELD

The present invention relates to a network function virtualization (NFV) technology, and more particularly, to a virtual customer premises equipment (vCPE) service provisioning method by providing a management interface and a data interface through a single Internet line, and a NFV cloud for the same.

BACKGROUND ART

Customer premises equipment (CPE), which is an in-house apparatus directly connected to a network of a communication service provider (CSP), may be provided by the CSP or installed by a subscriber (or customer). That is, the CPE 110 may be located in a customer (i.e., subscriber) home, provide a connection with a communication channel provided by the CSP, and generally perform functions such as a router, a firewall, a network address translation (NAT) and a dynamic host configuration protocol (DHCP). In other words, the CPE may receive traffic originating from the customer side and provide the customer with Internet connections through the communication channel, or act as a firewall for the traffic coming from the Internet.

Meanwhile, a virtual CPE (i.e., vCPE) may mean virtualization of the CPE so that the CPE network services are performed not in the home CPE but in a NFV cloud by virtualizing the CPE network services.

Among various methods of providing a vCPE service based on NFV, a method of providing a vCPE service by configuring a single NFV cloud node in the customer premises is the easiest form of business application because the number of customers affected by a failure is minimized. In this method, a cloud node is configured for only one customer, and a vCPE device is configured in the cloud node to provide a service, thereby providing the customer with the best transmission latency and exclusive use of resources.

Currently, although various vendors implement the above-described type of NFV cloud nodes, these are designed as a form in which a management interface and a data interface exist separately (i.e., a form in which a public IP address for management and a public IP address for data transfer for vCPE service). However, most small business customers are using Internet services in form of using a single DHCP-based dynamic IP address.

Therefore, in order to configure a vCPE device in a single NFV cloud node even when there is no separate management interface, a data interface should be utilized also for management. In other words, a single interface (i.e., a single IP address) should be used for management before the vCPE is configured on the NFV cloud, and used simultaneously for data networking and management after the vCPE is configured.

However, once the vCPE is configured in the cloud node, there is a problem that the data interface cannot be used for management because it exclusively uses the data interface. That is, before the vCPE is configured on the NFV cloud node, a host process of the corresponding NFV cloud node may have a connection to the Internet by using a wide area network (WAN) physical interface, but when the vCPE is configured, the vCPE uses the WAN physical interface exclusively. As a result, once the vCPE is configured, it becomes impossible to control the host process of the NFV cloud node. Also, even when the vCPE malfunctions due to a sudden failure, there is no way to remotely access the host process of the NFV cloud node to handle the failure.

DISCLOSURE

Technical Problem

The first purpose of the present invention for resolving the above-described problem is to provide a NFV cloud for vCPE service providing a management interface and a data interface through a single Internet line.

The second purpose of the present invention for resolving the above-described problem is to provide a method of creating a vCPE service in a NFV cloud providing a management interface and a data interface through a single Internet line.

The third purpose of the present invention for resolving the above-described problem is to provide a method of terminating and deleting a vCPE service in a NFV cloud providing a management interface and a data interface through a single Internet line.

Technical Solution

A NFV cloud providing a virtual customer premises equipment (vCPE) service by using a single Internet line, according to an aspect of the present invention for achieving the above-described first purpose, may comprise a vCPE service with a local area network (LAN) virtual interface, a wide area network (WAN) virtual interface, and a management virtual interface; a LAN virtual network, a WAN virtual network, and a management virtual network respectively connected to the LAN virtual interface, the WAN virtual interface, and the management virtual interface of the vCPE service; a LAN physical interface for providing a customer traffic received from a customer to the LAN virtual network; a WAN physical interface for outputting a traffic output from the WAN physical network and passed through the vCPE service to outside, or for connecting the management virtual network to outside in order to provide management functions for the vCPE service or the NFV cloud; and an interface agent for controlling a connection between the WAN physical interface and the WAN virtual network or the management virtual network.

At least one of the management virtual network and the WAN virtual network may be configured as a bridge interface.

An Internet Protocol (IP) address for the vCPE service may be assigned to the management virtual network or the WAN virtual interface instead of the WAN physical interface.

The interface agent may connect the WAN physical interface to the management virtual network before the vCPE service is configured and to the WAN virtual network after the vCPE service is configured.

The WAN virtual interface of the vCPE service may be generated to have a same medium access control (MAC) address as the WAN physical interface, so that a same IP address is allocated before and after configuration of the vCPE service.

The NFV cloud may be located in a customer premises, and configured in a form in which a cloud control system and a compute node are integrated into one node.

In response to a request from a virtualized network function manager (VNFM) controlled by an orchestrator for the NFV cloud, the interface agent may control a connection between the WAN physical interface and the WAN virtual network or the management virtual network.

A method of creating a vCPE service in a NFV cloud providing a vCPE service using a single Internet line, according to an aspect of the present invention for achieving the above-described second purpose, may comprise creating, by a virtual infrastructure manager (VIM), a vCPE service according to a request of an orchestrator; receiving, by a virtualized network function manager (VNFM), a request of configuring the created vCPE service from the orchestrator; and switching, by an agent, a connection target of a wide area network (WAN) physical interface of the NFV cloud from a management virtual network to a WAN virtual network according to a request of the VNFM.

The method may further comprise configuring all traffic of the management virtual network to pass through the vCPE service, and configuring the traffic passing through the vCPE service to be input to the WAN virtual network and output to outside through the WAN physical interface.

At least one of the management virtual network and the WAN virtual network may be configured as a bridge interface.

An Internet Protocol (IP) address for the vCPE service may be assigned to the management virtual network or the WAN virtual interface instead of the WAN physical interface.

The method may further comprise, after the connection target of the WAN physical interface is switched from the management virtual network to the WAN virtual network, configuring, by the VNFM, a medium access control (MAC) address of the vCPE service, and receiving, by the vCPE service, an IP address from a dynamic host configuration protocol (DHCP) server.

The method may further comprise, after the connection target of the WAN physical interface is switched from the management virtual network to the WAN virtual network, requesting, by the VNFM, a network connection test to the agent, and performing, by the agent, the network connection test and returning a network connection test result to the VNFM.

The method may further comprise, after the connection target of the WAN physical interface is switched from the management virtual network to the WAN virtual network, creating, by the agent, a monitoring agent performing monitoring on the vCPE service according to a control of a monitoring server requested by the orchestrator to start the monitoring on the vCPE service.

A method of terminating a vCPE service in a NFV cloud providing a vCPE service using a single Internet line, according to an aspect of the present invention for achieving the above-described third purpose, may comprise receiving, by a virtualized network function manager (VNFM), an instruction to prepare to terminate the vCPE service from an orchestrator; switching, by an interface agent, a connection target of a wide area network (WAN) physical interface of the NFV cloud from a WAN virtual network to a management virtual network according to an instruction of the VNFM; and deleting, by a virtual infrastructure manager (VIM), the vCPE service according to an instruction of the orchestrator.

At least one of the management virtual network and the WAN virtual network may be configured as a bridge interface.

An Internet Protocol (IP) address for the vCPE service may be assigned to the management virtual network or the WAN virtual interface instead of the WAN physical interface.

The method may further comprise, after the connection target of the WAN physical interface is switched from the management virtual network to the WAN virtual network, requesting, by the VNFM, a network connection test to the agent, and performing, by the agent, the network connection test and returning a network connection test result to the VNFM.

Advantageous Effects

When the above-described vCPE service creation/termination method in the NFV cloud or the NFV cloud according to the present invention is used, management and control on the NFV cloud can be continuously performed using only a single Internet line even after the vCPE service is configured on the NFV cloud. Therefore, it is made possible to economically provide the vCPE service to a small customer company using only a single Internet line.

Also, immediate and remote control on the vCPE service or the NFV cloud can be made possible even in the event of a failure of the vCPE service or NFV cloud component, thereby reducing time and cost of trips to resolve the failure.

DESCRIPTION OF DRAWINGS

FIG. 1 is a conceptual diagram for explaining virtualization of customer premises equipment (CPE) network services.

FIG. 2 is a block diagram illustrating a NFV cloud for vCPE services according to an embodiment of the present disclosure.

FIG. 3 is a block diagram illustrating an embodiment of configuration of a single Internet line-based NFV cloud for vCPE service according to the present invention.

FIGS. 4 and 5 are conceptual diagrams illustrating a concept of providing a management interface and a data interface using a single Internet line in a single Internet line-based NFV cloud for vCPE service according to the present invention.

FIG. 6 is a sequence chart illustrating a method of creating a vCPE service in a single Internet line-based NFV cloud for vCPE service according to the present invention.

FIG. 7 is a sequence chart illustrating a method for terminating a vCPE service in a single Internet line-based NFV cloud for vCPE service according to the present invention.

FIG. 8 is a sequence chart for explaining a periodic monitoring procedure of a vCPE service in a single Internet line-based NFV cloud for vCPE service according to the present invention.

BEST MODE

While the invention is susceptible to various modifications and alternative forms, specific embodiments thereof are shown by way of examples in the drawings and will herein be described in detail. It should be understood, however, that there is no intent to limit the invention to the particular forms disclosed, but on the contrary, the invention is meant to cover all modifications, equivalents, and alternatives falling within the spirit and scope of the invention. Like numbers refer to like elements in the accompanying drawings.

It will be understood that, although the terms first, second, A, B, etc. may be used herein to describe various elements, these elements should not be limited by these terms. These terms are only used to distinguish one element from another. For example, a first element could be termed a second element, and, similarly, a second element could be termed a first element, without departing from the scope of the inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, it will be understood that when an element is referred to as being "directly connected" or "directly coupled" to another element, there are no intervening elements present.

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a conceptual diagram for explaining virtualization of customer premises equipment (CPE) network services.

Referring to FIG. 1, customer premises equipment (CPE), which is an in-house apparatus directly connected to a network of a communication service provider (CSP), may be provided by the CSP or installed by a subscriber (or customer). For example, a CPE 110 may be one of a variety of terminal apparatuses such as a router, a home gateway, and a femto cell.

That is, the CPE 110 may be located in a customer (i.e., subscriber) home, provide a connection with a communication channel provided by the CSP, and generally perform functions such as a router, a firewall, a network address translation (NAT) and a dynamic host configuration protocol (DHCP). In other words, the CPE may receive traffic originating from the customer side and provide the customer with Internet connections through the communication channel, or act as a firewall for the traffic coming from the Internet.

In virtualization of the CPE network services according to embodiments of the present invention, the CPE network services may not be performed in the home CPE but in a NFV cloud by virtualizing the CPE network services.

That is, a virtual CPE (vCPE) may be a set of virtualized network service functions for providing the virtualized CPE network services in the NFV cloud, and may be composed of vNAT 111, vDHCP 112, vVPN 113, vFW 114, and the like.

For example, in case that the conventional CPE requires network service elements such as a NAT, a DHCP, a broadband remote access server (BRAS), a firewall, etc., the vCPE may provide these network service elements as virtualized service functions (SFs) such as vNAT 111, vDCHP 112, vVPN 113, vFW 114, and the like.

The vNAT 111 may convert private internet protocol (IP) address and port into public IP address and port to enable communications between a private IP network and a public IP network. It may also be made possible to protect a user's internal network from an external network constituted by the public IP network by configuring the user's internal network as a private IP network.

The vDHCP 112 may perform a role of assigning a private IP address to a terminal or a network device connected to the CPE 110. However, a specific terminal may be assigned a public IP address through a DHCP server of the CSP without being assigned a private IP address through the vDHCP of the vCPE.

The vFW 114 may perform firewall functions to block and control aggressive traffic and harmful traffic from the external network. Also, the vVPN 113 may perform a function of configuring a virtual private network (VPN) with an external host through a public network which is an external network.

In the case of CPE virtualization, the CPE 110 may be configured to have only a few basic network functions, such as layer-2 (L2) switching. A controller 120 may perform a function of configuring and managing a corresponding policy according to which network functions of the vCPE are used by a specific customer. Also, the CPE 110 may also communicate with the vCPE services in the NFV cloud through a transport network.

In addition to the existing cloud infrastructure configuration, the NFV cloud for provisioning of the vCPE network services may be configured to have a direct network connection with the CSP as well as a connection to the customer in order to receive the customer's traffic.

The NFV cloud according to embodiments of the present invention may exist not only within customer premises, but also within the CSP's local telecommunication office (LTO) or a data center (DC). Unlike the conventional IT cloud, the NFV cloud according to the present disclosure may be configured in a relatively small size and may have various node configurations. For example, the NFV cloud may be located in customer premises as a single computer node, or may be located in the LTO with a single rack or dual rack configuration. Also, it may also be extended to a larger scale, and located in a strategic position.

The NFV cloud may have a wide variety of forms as the conventional IT cloud. For example, the smallest NFV cloud may be provided with all cloud components and vCPE network service functions running on a single compute node. Alternatively, the NFV cloud may be provided in a form that simultaneously provides services to a plurality of customers using a plurality of compute nodes. In this case, the NFV cloud may be typically configured in a small server room and may be located at the LTO of the CSP. Alternatively, the NFV cloud may be configured using a large number of compute nodes in a large space such as a DC.

The configurations of the NFV cloud for the vCPE service according to the present invention described above will be explained with reference to FIGS. 2 and 3.

FIG. 2 is a block diagram illustrating a NFV cloud for vCPE services according to an embodiment of the present disclosure.

The NFV cloud 200 for vCPE services illustrated in FIG. 2 may have a form in which all cloud components operate in a single compute node and vCPE network services for a customer operate in the single compute node. That is, the NFV cloud is located in a customer premises, and configured in a form in which a cloud control system and a compute node are integrated into one node.

Thus, since the NFV cloud illustrated in FIG. 2 is installed in the customer premises, it may be referred to as 'customer NFV cloud' hereinafter.

Referring to FIG. 2, a network configuration of the NFV cloud 200 for vCPE service according to the present invention may be different from the conventional IT cloud. That is, although the conventional IT cloud is connected to the outside of the cloud via a layer-3 (L3) based IP network, the NFV cloud 200 for vCPE service according to the present invention may be connected to the outside of the cloud via a L2 based Ethernet network.

Also, in the customer NFV cloud 200 for vCPE service according to the present invention, a plurality of virtual networks may be configured to provide the vCPE services. That is, a Local Area Network (LAN) virtual network 210 may be basically configured for connection with the customer. Also, a wide area network (WAN) virtual network 220 for connection with the external Internet may be configured.

Also, at least one vCPE service 230 may be executed on the compute node of the NFV cloud 200. In FIG. 2, only one vCPE service is illustrated as highlighted for convenience of description, but two or more vCPE services may be executed on the NFV cloud 200. As described above with reference to FIG. 1, the vCPE service 230 may be a service such as NAT, DHCP, BRAS, or firewall. The vCPE service 230 may be connected to the LAN virtual network 210 and the WAN virtual network 220 described above via a LAN virtual interface 231 and a WAN virtual interface 232 of each service. That is, at least one vCPE service including the vCPE service 230 may be connected to the LAN virtual network 210 and the WAN virtual network 220 via their respective LAN virtual interfaces and WAN virtual interfaces. Here, L2 traffic from the customer may be inputted through the LAN virtual interface 231, and L3 traffic for which the vCPE service is processed may be output through the WAN virtual interface 232.

The LAN virtual network 210 and the WAN virtual network 220 may be respectively connected to a LAN physical interface 211 and a WAN physical interface 221. The LAN physical interface 211 may receive L2 traffic from the customer, and the WAN physical interface 221 may provide transparent network connectivity with the network outside the NFV cloud (e.g., Internet).

Also, a service agent 241 that interacts with an orchestrator to manage the vCPE services 230 and perform interworking with other NFV clouds to be described later and a monitoring agent 242 for detecting abnormal operation of the NFV cloud 200 may be provided on the NFV cloud 200.

Since the customer NFV cloud 200 is configured as a single compute node unlike a LTO NFV cloud 300 and a DC NFV cloud 400 which will be described later, the service agent 241 and the monitoring agent 242 may directly interoperate with an orchestrator or a monitoring server to be described later without a service manager or a monitoring manager. In this regard, the service agent 241 and the monitoring agent 242 of the customer NFV cloud 200 may be referred to as a service manager or a monitoring manager, respectively.

Also, although not shown in FIG. 2, the customer NFV cloud 200 may further comprise a compute node monitoring agent that monitors the compute node. That is, the service agent 241 and the monitoring agent 242 are components for each customer, but the compute node monitoring agent may be a component for each compute node. In the case of the customer NFV cloud 200, the monitoring agent 242 may serve as a compute node monitoring agent because the customer NFV cloud 200 is composed of a single compute node and has a configuration for a single customer.

Meanwhile, when the vCPE services 230 is removed or fails, the traffic from the customer may not be transmitted to the vCPE service 230 but transmitted directly from the LAN physical interface 211 to the WAN physical interface 221. If the LAN physical interface 211 is configured as a bypass network interface card (NIC), when a problem occurs in the compute node itself in which the vCPE service 230 operate, the WAN physical interface 221 may directly output the traffic from the customer through hardware setting under the control of the service agent 241 in cooperation with the orchestrator to be described later. Alternatively, when an operating system (OS) of the compute node operating the vCPE services operates normally, traffic flowing into the LAN physical interface 211 may be transferred directly to the WAN physical interface 221 through a bridge function operating on the OS.

FIG. 3 is a block diagram illustrating an embodiment of configuration of a single Internet line-based NFV cloud for vCPE service according to the present invention, and FIGS. 4 and 5 are conceptual diagrams illustrating a concept of providing a management interface and a data interface using a single Internet line in a single Internet line-based NFV cloud for vCPE service according to the present invention.

Referring to FIG. 3, as compared to the NFV cloud 200 described with reference to FIG. 2, a single Internet line-based NFV cloud 300 may comprise a management (MGMT) virtual interface 233 and a MGMT virtual network 310 as additional components, and may further comprise an interface agent 320 for controlling a connection between the WAN physical interface 221 to the WAN virtual network 220 or the MGMT virtual network 310.

Here, the interface agent 320 may exist as a separate agent, or the service agent 241, the monitoring agent 242, or the compute node monitoring agent may be configured to include the function of the interface agent 320.

Here, the MGMT virtual network 310 may mean a separate virtual network configured in the NFV cloud so that a control on a host process of the NFV cloud 300 is continued even after the vCPE service 230 is configured in the NFV cloud node 300. In particular, the MGMT virtual network 310 may be configured as a bridge interface, and the MGMT virtual interface 233 generated for each vCPE service at the time of configuring the vCPE service 230 may be connected to the bridge interface.

In the single Internet line-based NFV cloud node 300 according to the present invention, the bridge interface configured as the MGMT virtual network 310 may directly communicates with the MGMT virtual interface 233 of the vCPE service 230 with a fixed IP address. That is, processes inside the cloud node may monitor a state of the vCPE service and perform necessary control through this virtual network even in the absence of an Internet connection.

FIG. 4 illustrates a situation before the vCPE service is configured in the NFV cloud node 300 (i.e., a situation in which the host process is connected to the outside). At this time, in the NFV cloud node 300, an IP address may not be directly assigned to the WAN physical interface 221 when the IP address is allocated from the DHCP server. Instead, the WAN physical interface 221 may be connected to the MGMT virtual network 310, and then an IP address may be assigned to the MGMT virtual network 310 (i.e., bridge interface for management). A host process (not shown) for state management and control of the NFV cloud node may be connected to the MGMT virtual network 310 and to the external Internet via the MGMT virtual network 310 and the WAN physical interface 221.

On the other hand, FIG. 5 illustrates a situation after the vCPE service is configured in the NFV cloud node 300 (i.e., a situation in which the vCPE is connected to the outside). When the vCPE service is configured in the NFV cloud node 300, the WAN physical interface 221 may be connected to the WAN virtual network 220 instead of the MGMT virtual network 310.

At this time, a switching of a connection between the WAN physical interface 221 and the MGMT virtual network 310 or the WAN virtual network 220 may be performed by the interface agent 320 described above.

Also, in the NFV cloud node 300, the WAN virtual interface 232 of the vCPE may be generated to have the same MAC address as the WAN physical interface 221, so that the same IP address can be assigned to the WAN virtual interface 232 before and after the vCPE service is configured. This can provide ease of service management.

Meanwhile, in the single Internet line-based NFV cloud node 300 according to an embodiment of the present invention, the service agent 241, the monitoring agent 242, the compute node monitoring agent (not shown), and the like should be configured to directly communicate with an orchestrator and a monitoring server. However, as described above, since most of the small-scale company customers use the Internet service in the form of using only one DHCP-based dynamic IP service, the agents should also use a single WAN physical interface to be connected to an external orchestrator and a monitoring server. In this case, the service agent 241, the monitoring agent 242 and the compute node monitoring agent may be configured to directly communicate with the orchestrator and the monitoring server via the MGMT virtual network 310 and the single WAN physical interface 221.

FIG. 6 is a sequence chart illustrating a method of creating a vCPE service in a single Internet line-based NFV cloud for vCPE service according to the present invention.

Referring to FIG. 6, the agent 320 and the virtual infrastructure manager (VIM) 350 described above, and a virtualized network function manager (VNFM) 360 may exist as components of the NFV cloud node 300 according to the present invention, and an orchestrator 600, a monitoring server 610, and a DCHP server 620 may exist as external components.

Here, the VIM 350 and the VNFM 360 may be known components for the implementation of NFV technology.

For example, the VIM 350 may be a component for managing and controlling hardware and software components configured as an environment in which virtualized network functions (VNFs) can be performed. On the other hand, the environment in which VNFs can be performed (i.e., network function virtualization infrastructure (NFVI)) may include computing hardware including compute nodes, storage hardware including physical storage hardware resources, an infrastructure network including virtual networks allocated to virtual machines and network hardware meaning physical network devices, and the like.

For example, the VNFM 360 may be a component that performs lifecycle management of VNFs among VNFs, virtual resources, and the orchestrator 600 that orchestrates services. In particular, the VNFM 260 may manage association between virtual resources and VNFs in a cloud environment, and maintain and optimize continuity of services provided by the VNFs by responding to events or state changes occurring therebetween.

Further, the agent 320 may be the interface agent described with reference to FIGS. 2 to 5. Also, the agent 320 may serve as the service agent 241 or the monitoring agent 242 and may reside on the NFV cloud as a separate component from the service agent 241 or the monitoring agent 242.

First, the orchestrator 600 may request the VIM 350 to create a vCPE 230 (e.g., vFW, vNAT, vUTM, or the like) on the NFV cloud according to an instruction of a user or a system administrator (S610). In response to the instruction, the VIM 350 may create a resource and a virtual machine for the vCPE service on the NFV cloud to create the vCPE service 230 (S611), and return the result of the creation to the orchestrator 600 (S612).

Then, the orchestrator 600 may request the VNFM 360 to perform initial configuration on the created vCPE 230 (S620), and the VNFM 360 may perform the initial configuration on the created vCPE 230 (S621), and request the agent 320 to switch the connection of the WAN physical interface 221 (S630).

In this case, according to the request of the VNFM 360, the agent 320 may switch a connection target of the WAN physical interface 221 from the MGMT virtual network 310 (i.e., bridge interface for management) to the WAN virtual network 220 (i.e., bridge interface for WAN virtual network) (S631). That is, the step S631 may refer to a step of switching the state of the NFV cloud from the state illustrated in FIG. 4 to the state illustrated in FIG. 5. The agent 320 may return the execution result according to the request of the VNFM 360 to the VNFM 360 (S632).

Thereafter, the VNFM 360 may configure a MAC address of the vCPE 230 and configure a DHCP server 620 for allocating an IP address of the vCPE 230 (S640), and the vCPE 230 may be allocated an IP address from the DHCP server 620 (S641).

Thereafter, the VNFM 360 may change a routing table inside the cloud node to configure the IP address of the MGMT virtual interface 233 of the vCPE 230 as a default gateway so that Internet can be connected through the vCPE 230. Also, a DNAT may be added to the vCPE 230 to continue connection with processes inside the cloud node from outside the cloud node, such as the orchestrator 600).

In addition, the VNFM 360 may request the agent 320 to test the network connection established (S650). The agent 320 may perform the test of the network connection (S651), and then return the network connection test result to the VNFM (S652). Thereafter, the VNFM 360 may notify the orchestrator 600 that the configuration of the vCPE, the allocation of the IP address, and the connection to the WAN physical interface 221 are completed (S660).

Meanwhile, the orchestrator 600 may request the monitoring server 610 to perform monitoring on the created vCPE 230 (S670). The monitoring server 610 may transmit a reply to the monitoring request to the orchestrator 600 (S671), and request the agent 320 to generate a monitoring agent for the vCPE 230 and start monitoring (S672).

FIG. 7 is a sequence chart illustrating a method for terminating a vCPE service in a single Internet line-based NFV cloud for vCPE service according to the present invention.

Referring to FIG. 7, the NFV cloud internal components (agent, VIM, VNFM, vCPE service) and external components (orchestrator, monitoring server, DHCP server) illustrated in FIG. 6 are shown, and a process of deleting and terminating the vCPE service 230 created through the procedure described with reference to FIG. 6 will be described.

Before terminating the vCPE service 230, the orchestrator 600 may request the monitoring server 610 to stop the monitoring on the vCPE service 230 if monitoring is in progress for the vCPE service 230, and the monitoring server 610 may request the agent 320 to stop the operation of the monitoring agent for the vCPE service 230 (S711). The monitoring server 610 may notify the orchestrator 600 of the processing result of stopping the monitoring (S712). If the monitoring for the vCPE service 230 is not in progress, the steps S710 to S712 may be omitted.

Thereafter, the orchestrator 600 may request the VNFM 360 to prepare for termination of the vCPE service 230 (S720).

In response to the request of the orchestrator, the VNFM 360 may request the agent 320 to switch back the connection of the WAN physical interface 221 (S730).

In this case, according to the request of the VNFM 360, the agent 320 may switch the connection target of the WAN physical interface 221 from the WAN virtual network 220 (i.e., bridge interface for the WAN virtual network) to the MGMT virtual network 310 (i.e., bridge interface for management) (S732). That is, the step S732 may mean switching the state of the NFV cloud from the state illustrated in FIG. 5 to the state illustrated in FIG. 4. The agent 320 may return the execution result according to the request of the VNFM 360 to the VNFM 360 (S733).

In addition, the VNFM 360 may request the agent 320 to test the network connection established (S740). The agent 320 may perform the network connection test (S741), and the return the network connection test result to the VNFM 360 (S742).

Thereafter, the VNFM 360 may notify the orchestrator 600 that the preparation for terminating the corresponding vCPE service is completed (S750). The orchestrator 600 may request the VIM 350 to delete the vCPE service 230 (S760). In response to the request, the VIM 350 may delete the vCPE service 230 on the NFV cloud (S761), and return the deletion result to the orchestrator 600 (S762).

FIG. 8 is a sequence chart for explaining a periodic monitoring procedure of a vCPE service in a single Internet line-based NFV cloud for vCPE service according to the present invention.

Referring to FIG. 8, the monitoring agent (or, interface agent) generated on the NFV cloud node by the step S672 described with reference to FIG. 6 may periodically check the state of the vCPE service (e.g., whether a connection to outside is normally maintained) and the state of the WAN physical interface of the NFV cloud (i.e., the state of network interface card (NIC)) (S810).

When it is determined that the state of the WAN physical interface is abnormal (S820), the operation of the vCPE service may be immediately terminated (S821) or the step S810 of identifying the state may be performed again after waiting for a predetermined time (S822).

When the state of the WAN physical interface is determined to be normal, a test (e.g., a PING test) to check whether the vCPE service is normally connected to the outside is performed (S830), and whether or not the test is successful is determined (S840). When the test is successful (i.e., when the vCPE service is normally connected to the outside), the step S810 of identify the state may be performed again after waiting for a predetermined time (S822).

When it is determined that the vCPE service is not normally connected to the outside, the connection target of the WAN physical interface 221 may be switched by the interface agent 320 from the WAN virtual network 220 (i.e., bridge interface for the WAN virtual network) to the MGMT virtual network 310 (i.e., bridge interface for management) (S850).

Thus, when the connection of the WAN physical interface is switched to the MGMT virtual network 310 (i.e., bridge interface for management) by the step S850, the agent (monitoring agent, interface agent, or compute node monitoring agent) may report the state of the vCPE service or the state of the NFV cloud component to the outside, and then a control message or signal can be received from the outside.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

Furthermore, the above-mentioned method or apparatus may be implemented by combining all or a part of the configuration or function, or may be implemented separately.

While the embodiments of the present disclosure and their advantages have been described in detail, it should be understood that various changes, substitutions and alterations may be made herein without departing from the scope of the present disclosure.

The invention claimed is:

1. A network function virtualization (NFV) cloud providing a virtual customer premises equipment (vCPE) service by using a single Internet line, the NFV cloud comprising:
    a vCPE service with a local area network (LAN) virtual interface, a wide area network (WAN) virtual interface, and a management virtual interface;
    a LAN virtual network, a WAN virtual network, and a management virtual network respectively connected to the LAN virtual interface, the WAN virtual interface, and the management virtual interface of the vCPE service;
    a LAN physical interface for providing a customer traffic received from a customer to the LAN virtual network;
    a WAN physical interface for outputting a traffic output from the WAN physical network and passed through the vCPE service to outside, or for connecting the management virtual network to outside in order to provide management functions for the vCPE service or the NFV cloud; and
    an interface agent for controlling a connection between the WAN physical interface and the WAN virtual network or the management virtual network.

2. The NFV cloud according to claim 1, wherein at least one of the management virtual network and the WAN virtual network is configured as a bridge interface.

3. The NFV cloud according to claim 1, wherein an Internet Protocol (IP) address for the vCPE service is assigned to the management virtual network or the WAN virtual interface instead of the WAN physical interface.

4. The NFV cloud according to claim 1, wherein the interface agent connects the WAN physical interface to the management virtual network before the vCPE service is configured and to the WAN virtual network after the vCPE service is configured.

5. The NFV cloud according to claim 1, wherein the WAN virtual interface of the vCPE service is generated to have a same medium access control (MAC) address as the WAN physical interface, so that a same IP address is allocated before and after configuration of the vCPE service.

6. The NFV cloud according to claim 1, wherein the NFV cloud is located in a customer premises, and configured in a form in which a cloud control system and a compute node are integrated into one node.

7. The NFV cloud according to claim 1, wherein the interface agent, in response to a request from a virtualized network function manager (VNFM) controlled by an orchestrator for the NFV cloud, controls a connection between the WAN physical interface and the WAN virtual network or the management virtual network.

8. A method of creating a virtual customer premises equipment (vCPE) service in a Network Function Virtualization (NFV) cloud providing a vCPE service using a single Internet line, the method comprising:
creating, by a virtual infrastructure manager (VIM), a vCPE service according to a request of an orchestrator;
receiving, by a virtualized network function manager (VNFM), a request of configuring the created vCPE service from the orchestrator; and
switching, by an agent, a connection target of a wide area network (WAN) physical interface of the NFV cloud from a management virtual network to a WAN virtual network according to a request of the VNFM.

9. The method according to claim 8, further comprising configuring all traffic of the management virtual network to pass through the vCPE service, and configuring the traffic passing through the vCPE service to be input to the WAN virtual network and output to outside through the WAN physical interface.

10. The method according to claim 8, wherein at least one of the management virtual network and the WAN virtual network is configured as a bridge interface.

11. The method according to claim 8, wherein an Internet Protocol (IP) address for the vCPE service is assigned to the management virtual network or the WAN virtual interface instead of the WAN physical interface.

12. The method according to claim 8, further comprising, after the connection target of the WAN physical interface is switched from the management virtual network to the WAN virtual network, configuring, by the VNFM, a medium access control (MAC) address of the vCPE service, and receiving, by the vCPE service, an IP address from a dynamic host configuration protocol (DHCP) server.

13. The method according to claim 8, further comprising, after the connection target of the WAN physical interface is switched from the management virtual network to the WAN virtual network, requesting, by the VNFM, a network connection test to the agent, and performing, by the agent, the network connection test and returning a network connection test result to the VNFM.

14. The method according to claim 8, further comprising, after the connection target of the WAN physical interface is switched from the management virtual network to the WAN virtual network, creating, by the agent, a monitoring agent performing monitoring on the vCPE service according to a control of a monitoring server requested by the orchestrator to start the monitoring on the vCPE service.

15. A method of terminating a virtual customer premises equipment (vCPE) service in a Network Function Virtualization (NFV) cloud providing a vCPE service using a single Internet line, the method comprising:
receiving, by a virtualized network function manager (VNFM), an instruction to prepare to terminate the vCPE service from an orchestrator;
switching, by an interface agent, a connection target of a wide area network (WAN) physical interface of the NFV cloud from a WAN virtual network to a management virtual network according to an instruction of the VNFM; and
deleting, by a virtual infrastructure manager (VIM), the vCPE service according to an instruction of the orchestrator.

16. The method according to claim 15, wherein at least one of the management virtual network and the WAN virtual network is configured as a bridge interface.

17. The method according to claim 15, wherein an Internet Protocol (IP) address for the vCPE service is assigned to the management virtual network or the WAN virtual interface instead of the WAN physical interface.

18. The method according to claim 15, further comprising, after the connection target of the WAN physical interface is switched from the management virtual network to the WAN virtual network, requesting, by the VNFM, a network connection test to the agent, and performing, by the agent, the network connection test and returning a network connection test result to the VNFM.

* * * * *